United States Patent [19]
Aharoni et al.

[11] Patent Number: 5,139,879
[45] Date of Patent: * Aug. 18, 1992

[54] FLUOROPOLYMER BLEND ANTI-REFLECTION COATINGS AND COATED ARTICLES

[75] Inventors: Shaul M. Aharoni, Morris Plains; Ajay Nahata, Chatham; James T. Yardley, Morristown, all of N.J.

[73] Assignee: Allied-Signal Inc., Morristownship, N.J.

[*] Notice: The portion of the term of this patent subsequent to Jun. 2, 2009 has been disclaimed.

[21] Appl. No.: 796,516

[22] Filed: Nov. 21, 1991

Related U.S. Application Data

[63] Continuation-in-part of Ser. No. 762,998, Sep. 20, 1991.

[51] Int. Cl.$^5$ .................. B32B 27/28; B32B 17/10
[52] U.S. Cl. .................. 428/422; 428/421; 525/200; 313/466; 359/601
[58] Field of Search .................. 525/200; 428/422

[56] References Cited

U.S. PATENT DOCUMENTS

| | | | |
|---|---|---|---|
| 3,910,187 | 10/1975 | Cords | 430/302 |
| 4,130,706 | 12/1978 | Plambeck | 526/245 |
| 4,293,674 | 10/1981 | Andrews | 526/327 |
| 4,650,843 | 3/1987 | Yokoyama et al. | 526/245 |
| 4,791,166 | 12/1988 | Saukaitis | 524/544 |
| 5,061,769 | 10/1991 | Aharoni et al. | 526/245 |

*Primary Examiner*—Carman J. Seccuro
*Attorney, Agent, or Firm*—Gerhard H. Fuchs; Richard C. Stewart

[57] ABSTRACT

Solid bodies having a reflective surface are provided with an anti-reflection coating of a fluoropolymer blends of (1) a terpolymer composition derived from (a) perfluoroalkylakyl acrylate or methacrylate, (b) acrylic, methacrylic or itaconic acid, and (c) hydroxyl- containing acrylate or methacrylate; and (2) an amorphous fluoropolymer.

24 Claims, 6 Drawing Sheets

FLUOROPOLYMER BLEND ANTI-REFLECTION COATINGS AND COATED ARTICLES

CROSS-REFERENCE TO RELATED APPLICATION

This application is a continuation-in-part of commonly assigned copending U.S. application Ser. No. 07/762,998 filed Sep. 20, 1991.

FIELD OF THE INVENTION

This invention relates to the field of optical coatings for reducing reflection on reflective surfaces, such as optical surfaces, windows, transparent films, display surfaces, glossy photographs and the like. It provides coatings of curable optically clear fluoropolymer blends having low refractive index, and articles coated therewith.

BACKGROUND OF THE INVENTION

In any optical element, a portion of the incident light is reflected at each surface. The exact amount is determined by the refractive index change at the dielectric interface. The amount of light so reflected can be reduced by means of anti-reflection coating. There are four main reasons why anti-reflection coatings are desirable in optical systems. First, the percentage of reflected light is lowest at normal incidence. The percentage increases with a corresponding increase in the angle of observation. This limits the resolution of the image and, in some cases, can completely obscure the image. Second, an increase in reflected light corresponds to a decrease in transmitted light. For components such as compound lenses, this loss is multiplicative and may be intolerable. Third, reflections from optical surfaces often create unwanted or distracting glare. Finally, for components such as camera lenses and photographs, that contain many optical surfaces, there are multiple internal reflections. These reflections can cause stray light to hit the image plane and thereby reduce the image contrast and definition.

It has been well known for many years that unwanted reflections can be substantially reduced by providing a surface coating of an optically clear coating material having a refractive index which is lower than the refractive index of the substrate. However, difficulty in producing high quality thin films prevented significant practical application until approximately 1940, when technology for applying thin films of certain refractory inorganic materials via evaporation under high vacuum conditions was developed. More recently, low refractive index polymeric coatings, generally fluoropolymer coatings, have been developed for anti-reflection applications. Generally, these coatings, for maximum effectiveness, are about ¼ wavelength thick. The basic theory of such anti-reflection coatings is well known; the technical challenge is in the provision of conveniently applied, effective, strongly adherent, scratch-resistant and relatively low cost coatings with optimally low refractive index, over large areas.

SUMMARY OF THE INVENTION

This invention provides devices comprising a reflective substrate having deposited thereon as an anti-reflection coating a thin film of blends of (a) amorphous fluoropolymers with (b) certain cross-linkable terpolymers derived from fluorine-containing acrylic monomers with non-fluorinated acrylic monomers. These blends can be cured by application of heat to form semi-IPNs (interpenetrating networks) of the cured terpolymer which "trap" the amorphous fluoropolymer component. The cured blends remain amorphous, and they are optically clear. They are based on amorphous fluoropolymers containing only carbon and fluorine, and possibly hydrogen and/or oxygen, and they have low refractive indexes. Being soluble in specific organic solvents, solutions of the uncured blends can be used to make coatings and to cast films, which are cross-linkable. These coatings are optically clear, robust and strongly adherent to reflective substrates, including glass, polymer films, metals, crystal substrates and the like.

In accordance with the present invention, there are provided devices comprising a reflective substrate having deposited thereon as an anti-reflection coating an effective layer of a polymeric composition comprising a blend of (a) from about 1 to about 95 percent by weight of amorphous fluoropolymer, with
(b) from about 5 to about 99 percent by weight of a fluorinated copolymer having the general composition wherein
$R^1$ is H, —CH$_3$, or mixtures thereof;
$R^2$ is H, —CH$_3$, or —CH$_2$COOH;
$R^3$ is H, —CH$_3$, or —CH$_2$COOC$_m$H$_{2m+1}$, wherein m is an integer of from about 1 to about 4;
$R^4$ is an alkylene bridging group, straight chain, branched or cyclic, having from 1 to about 8 carbon atoms;
p is 1 or 2;
s, t and u represent weight proportions of the respective monomer-derived units, and have values within the ranges of
s=from about 0.5 to about 0.995;
t=from about 0.0025 to about 0.4975; and
u=from about 0.0025 to about 0.4975;
with the sum of s+t+u being 1; and
n is an integer of from about 1 to about 40; wherein the monomer-derived units may be arranged in any sequence. In the above formula, t and u may, but need not be the same.

An "effective layer" of said polymeric composition is a layer of thickness suitable for reduction of undesirable reflection. This may be evidenced by reduced reflection of the incident light, or by greater clarity or contrast of the image being observed through said layer, or by an improvement in any other manifestation which may be affected by reduction in reflection of incident light. Generally, though not necessarily, optimum reflection reduction is achieved when the layer of said polymeric composition is in the order of ¼ wavelength thick; other thicknesses, particularly greater thicknesses, are also effective with the fluoropolymer blends employed in the present invention.

The term copolymer, as used in the specification and claims, is intended to refer to a polymer derived from at least two or more, usually derived from at least three different monomer units. There is no theoretical limit on the number of different monomer units which may be incorporated into the fluorinated copolymers for the fluoropolymer blends for the anti-reflection coatings of the devices of the present invention; their number is limited only by the usual practical limitations imposed by polymerization process considerations, and the desire to obtain polymer products having useful properties. Sometimes, these copolymers are herein also referred to as terpolymers.

The copolymer component for the fluoropolymer blends for the anti-reflection coatings for the devices of the present invention may also be described as being made up of a polymer chain composed of (II)

units wherein s, t and u have the meanings given above in connection with formula (I), above, and wherein X represents monomer-derived units of the composition (III)

wherein $R^1$, p and n, which may be the same or different in individual X units within the polymer chain, have the meanings given in connection with formula (I), above;

Y represents monomer-derived units of the composition (IV)

wherein $R^2$, which may be the same or different in individual Y units within the polymer chain, has the meaning given in connection with formula (I), above; and Z represents monomer-derived units of the composition (V)

$$R^3-\underset{\underset{CH_2}{|}}{\overset{|}{C}}-\underset{\overset{\|}{O}}{C}-O-R^4-OH$$

wherein $R^3$ and $R^4$, which may be the same or different in individual Z units within the polymer chain, also have the meanings given in connection with formula (I), above.

In the copolymers of formula (II), above, the X, Y and Z units may be arranged in any sequence. This freedom of arrangement accordingly also prevails for formula (I), above, since formulas (I) and (II) are merely alternate expressions for the same polymeric compositions.

These copolymers can be prepared by polymerizing the monomers in tetrahydrofuran ("THF") or glacial acetic acid at elevated temperature with a free-radical generating initiator, using procedures conventionally employed in making acrylic and methacrylic polymers. For purposes of the present invention, they are preferably prepared in a polymerization medium comprising glacial acetic acid or 1,1,2-trichloro trifluoroethane. Copolymers of that type and their preparation are more particularly described in commonly assigned U.S. Pat. No. 5,061,769 issued Oct. 29, 1991 to Aharoni.

The term "amorphous fluoropolymer", for purposes of the present invention, defines a normally solid polymer having a fluorine-bearing carbon-to-carbon backbone chain containing carbon, fluorine and hydrogen, and possibly oxygen, and which is amorphous as determined by X-ray diffraction. As conventionally understood, a polymer is amorphous by X-ray diffraction if it shows only the "amorphous halo" and no crystalline reflections. These amorphous fluoropolymers generally are copolymers of tetrafluoroethylene ($CF_2=CF_2$) with other fluorine-bearing co-monomers such as, for example, $CH_2=CHF$, $CH_2=CF_2$, $CF_2=CHF$, $CH_2=CH-C_nF_{2n+1}$; $CF_2=CF-CF_3$; $CF_2=CF-O-C_nF_{2n+1}$; $CF_2=CF-O-CF_2CF(CF_3)-O-CF_2CF_2COOCH_3$, (2,2-bistrifluoromethyl-4,5-difluoro-1,3-dioxole), and the like. The co-monomer serves to prevent crystallization. Any amorphous fluoropolymer composition is suitable for use in the blends of the present invention, provided it has the requisite solubility in solvents in which the terpolymer compositions are also soluble, and it retains its amorphicity in these blends and does not phase separate during and after curing.

Amorphous fluoropolymers are commercially available products. They have a high degree of optical clarity, in combination with the excellent chemical, thermal and electrical properties of conventional crystalline or partially crystalline fluoropolymer, such as polytetrafluoroethylene. They have some degree of solubility in a limited selection of solvents. They are, for example, available from E. I. du Pont de Nemours and Company under the designation "Teflon-AF" (T.M.). Those provided by du Pont, for example, include copolymers of tetrafluoroethylene with 2,2-bistrifluoromethyl-4,5,-difluoro-1,3-dioxole (see Polymer Preprints 31 (1) 312 (1990)).

Coating compositions of these fluoropolymer blends can be prepared by separately dissolving the amorphous fluoropolymer and the above-described terpolymer in a suitable solvent for both of these components, such as, for example, the family of fluorinated solvents provided by Minnesota Mining and Manufacturing Company (3M) under its Fluorinert® trademark, e.g. perfluoro(2-n-butyl tetrahydrofuran), sold under the designation "FC-75" (also described in Macromolecules 10, 1162 (1977)), alone or in combination with 1,1,2-trichloro-trifluoro ethane (TCTFE) as a co-solvent. The resultant solutions can be mixed, in the desired proportions to obtain blends within the above-stated composition limits. The resultant mixture can then be applied to the desired substrate, in the manner described, infra, the solvent evaporated, and the residue polymer blend film can be cured (cross-linked) by application of heat to form robust, strongly adherent coatings.

These polymer blends are optically clear, without haze or inhomogeneities. They have refractive indexes below about 1.4, and as low as 1.327; good adhesion to glass, silicon, copper foil, polyimide, nylon, polyethylene terephthalate, polytetrafluoroethylene, polychlorotrifluoroethylene and other similar substrates; low surface energy, about half that of polytetrafluoroethylene; excellent thermal stability in air; in combination with good mechanical properties—they are neither brittle nor elastomeric.

It is an important feature of these fluoropolymer blends that their copolymer components can be cross-linked by heat treatment without the use of cross-linking agents. Such heat-induced cross-linking can occur either through internal anhydride formation between two internal carboxyl groups situated on pendant groups of monomer-derived moieties; or by internal esterification between hydroxyl and carboxyl groups. Heat-induced cross-linking has the advantage that no cross-linking agent is required, so that no impurities are introduced; the cured polymer is a single component with no residual solvent, monomer or cross-linking agents. The cross-linking process is not associated with creation of large voids which can establish optical scattering sites. Such cross-linking improves hardness, scratch resistance and adhesion of the polymer blend film, without change in refractive index, and without deleterious effect on any other desirable property. Heat treatment within the temperature range of from about 130° C. to about 150° C. for time periods of from about 0.25 to about 10 hours, desirably of from about 1 to 4 hours, results mainly in esterification; heat treatment at higher temperatures, say within the range of from about 170° C. to about 180° C., results in significant anhydride formation. As a general proposition, higher temperatures and longer heat treatment times tend to promote anhydride formation. Heat treatment can be accomplished by placing the coated object in a conventional convection oven, by exposure to infrared lamps, and the like.

Cross-linking agents may also be employed, if desired, as to be discussed in further detail below.

The unique properties of these fluoropolymer blends which make them so eminently suitable for use as anti-reflection coatings for optical devices are due to the presence in the terpolymer component of the fluorinated moiety in combination with moieties bearing carboxyl groups and moieties bearing hydroxyl groups. The fluorinated moieties provide the desirable properties of fluoropolymers, and the combination of the carboxyl groups and the hydroxyl groups provides for processability and curability, properties which are typically lacking in conventional fluoropolymers.

Anti-reflection coatings of the above-described fluoropolymer blends are conveniently applied to optical substrates, typically in ¼ wavelength thickness, by coating the substrate with a solution of the blend, removing excess solution, if any, drying by evaporating the solvent, preferably, but not necessarily, followed by heat-treatment, as above described, to cure the coating by means of cross-linking. Typical substrates include optical lenses; eyeglasses, both plastic and glass; windows, glass as well as polymeric windows, such as windows of clear polymeric vinyl (incl. copolymers thereof), styrene, acrylics (Plexiglass) or polycarbonate (Lexan®) supplied by General Electric; clear polymer films such as vinyl (incl. copolymers), nylon, polyester, and the like; the exterior viewing surface of liquid crystal displays, cathode ray tubes (e.g. video display tubes for televisions and computers); and the like; the surface of glossy displays and pictures, such as glossy prints and photographs; and the like. Determination of suitable coating thickness (generally ¼ wavelength of the light of which reflection is to be minimized) is within the ordinary skill of the art, but is further elucidated, infra.

BRIEF DESCRIPTION OF THE DRAWINGS

The present invention may be better understood with reference to the annexed drawings, wherein the FIGS. 1-5 provide transmission or reflectance spectra for articles, uncoated and coated in accordance with the invention, as follows.

DETAILED DESCRIPTION OF THE INVENTION

The following detailed description sets forth the preferred embodiments and the best mode presently contemplated for its practice.

Regarding the copolymer components of the fluoropolymer blends, with reference to the "X" units of formula (II), above, which are in more detail defined by formula (III), above, these are derived from fluorine-containing acrylate or methacrylate monomers of the formula $$CH_2=CR^1CO-O-(CH_2)_p-C_nF_{2n+1}$$

wherein $R^1$, p and n have the meanings given above in connection with formula (I). Those monomers wherein p is 2 are commercially available, as mixtures of homologues having perfluoroalkyl groups of varying chain length, that is to say as mixtures differing in "n", as they are usually obtained in commercial manufacturing operations. Of course, one could separate out individual compounds of defined perfluoroalkyl chain length, if it were desired for any reason. For use in the anti-reflections coating of the present invention, it is preferred to use monomers having a wider distribution of "n", since such wider distribution makes for better amorphicity, hence greater optical clarity, as will the use of acrylates (wherein in the above formula $R^1$ is H) with methacrylates (wherein in the above formula $R^1$ is $CH_3$). Those monomers wherein p is 1 can be readily prepared using known procedures. Preferably, p is 2 and n is an even number. In preferred embodiments, n ranges from about 2 to about 30, more preferably from about 4 to about 20. Specific examples of preferred embodiments are the products sold by DuPont under its "Zonyl" trademark, e.g. Zonyl TM (the methacrylate) and Zonyl TA-N (the acrylate), and sold by Hoechst-Celanese under its "NUVA-HF" trademark. Such specific examples include mixed perfluoroalkyl alkyl acrylates and methacrylates wherein n is predominantly an even number, and in particular wherein the perfluoroalkyl group is represented by a mixture of $C_4$ through $C_{20}$ groups, particularly $C_6$, $C_8$, $C_{10}$ and $C_{12}$ groups.

The "Y" units of formula (II), above, which are in more detail defined by formula (IV), above, are derived from acrylic acid, methacrylic acid, itaconic acid, or mixtures thereof. All of these are commercially available products.

The "Z" units of formula (II), above, which are in more detail defined by formula (V), above, are derived from acrylic acid esters of the formula $$CH_2=CR^3CO-O-R^4-OH$$

wherein $R^3$ and $R^4$ have the afore-stated meanings. In more preferred embodiments, $R^3$ is H or $-CH_3$, with $-CH_3$ being most preferred. If $R^3$ is represented by $-CH_2C_mH_{2m+1}$, then m is preferably an integer of from about 0 to about 6, more preferably of from about 1 to about 4. With respect to the $R^4$ alkylene bridging group, embodiments having from 2 to about 4 carbon atoms are preferred, as are the linear and branched chain embodiments. Use of mixtures of such monomers of differing carbon-carbon chain length is contemplated. To enhance amorphicity, use of mixtures of such monomers of differing carbon-carbon chain length is desirable and preferred. Many of the esters suitable for furnishing the "Z" units of formula (II), above, are commercially available; those not so available are readily prepared by those skilled in the art, using well-known procedures.

With regard to the weight proportions of the "X", "Y" and "Z" units (see formula II, above), s ranges from about 0.5 to about 0.995, and t and u, which may be the same or different, each range from about 0.0025 to about 0.4975. The preferred range for t+u is from about 0.005 to about 0.05, with values in the range of from about 0.01 to about 0.03 being more preferred yet. As to the weight ratio between t and u (t:u), weight ratios in the range from about 1:0.5 to about 1:1.5 are preferred, with ratios in the range of from about 1:0.8 to about 1:1.2 being more preferred yet. Polymeric compositions of the present invention containing approximately equal proportions by weight of the "Y" and "Z" components have been shown to have desirable properties. If it is contemplated to subject the polymeric composition to heat-induced cross-linking, as is preferred to obtain more robust anti-reflection coatings, then the Y and Z components are desirably employed in about equimolar proportions (rather than in about 1:1 weight ratio). If equimolar proportions are employed, then the cross-linking process, as above described, proceeds predominantly by the internal esterification route, with minimal anhydride formation. The esterification route is preferred because of the better stability of the resultant product in high temperature and humid environments.

Polymerization of the monomers to make the polymeric compositions for the anti-reflection coatings of this invention proceeds readily in solution, desirably in glacial acetic acid or 1,1,2-trichloro-trifluoroethane (TCTFE), at elevated temperature within the range of from about 35° C. to the boiling point of the polymerization mixture, more desirably within the range of from about 45° C. to the atmospheric pressure boiling point of the solvent, viz about 47° C. for TCTFE and about 110° C. for glacial acetic acid, under autogenous pressure, typically atmospheric pressure, using a free radical generating initiator, such as 2,2'-azobis(2-methylpropanenitrile) (CAS #78-67-1) available from DuPont under the designation VAZO 64, hereinafter referred to as "AIBN". Other suitable initiators include 2,2'-azobis(2,4-dimethylpentanenitrile) (CAS #4419-11-8) and 2,2'-azobis(2-methylbutanenitrile) (CAS #13472-08-7). The 2,2'-azobis(2-methylpropanenitrile) is preferred.

The catalyst is employed in amount of from about 0.15 to about 0.4 percent by weight, based on the combined weight of all the monomers to be polymerized. Desirably, polymerization is conducted under dry nitrogen atmosphere and with continuous agitation. Typical polymerization times range from about 4 hours to about 8 hours. The monomer concentration in the reaction medium typically ranges from about 35 to about 70 percent by weight, based on the combined weight of reaction medium (glacial acetic acid or TCTFE) and the monomers.

Upon conclusion of the polymerization reaction, the polymer product is readily recovered from the reaction mixture, as by evaporation of the solvent and/or cooling the mixture to precipitate the polymer product, followed by separation of liquid and solid phases, as by filtration, and washing of the polymer product to remove residual unreacted monomers using any suitable solvent, if desired. These operations are conventional. The polymer thus obtained is soluble in perfluoro(2-n-butyl tetrahydrofuran) of the formula available from 3M as Fluorinert ® FC-75, in concentrations of over 10 percent by weight, based on the combined weight of polymer product and solvent. Solution of the polymer product in this solvent is aided by mild heating and agitation. Mixtures of Fluorinert ®FC-75 solvent and TCTFE in up to about 1:1 vol./vol. ratio are often preferable for rapid dissolution of the terpolymer.

The appended claims are intended to cover anti-reflection coated optical devices wherein the terpolymer component of the fluoropolymer blends contain incidental amounts, say up to about 10% by weight of other comonomers, and particularly of acrylic esters, which do not interfere with the polymerization, and which do not deleteriously affect desirable properties of the polymer product. Examples of such incidental, additional monomeric materials include alkoxy alkyl acrylates and alkoxy alkyl methacrylates (such as methoxy, ethoxy, propoxy, butoxy and higher acrylates and methacrylates); epoxy alkyl methacrylates; alkyl acrylates and methacrylates, including haloalkyl derivatives thereof, such as chloroalkyl acrylates and methacrylates; and the like.

When the ratio of the Y-component (acid component) to the Z-component (hydroxyl- bearing acrylic ester) in the polymeric composition of this invention is larger than 1.0, then the preferred curing product is the anhydride. When the ratio is smaller than 1.0, an ester is the preferred product, with some hydroxyl groups remaining unreacted. When the ratio is 1.0, then the preferred product is the ester, with practically all the hydroxyl groups being consumed.

Example 1, below, illustrates typical polymerization procedure.

EXAMPLE 1

98.85 g of perfluoroalkylethyl methacrylate monomer mixture (DuPont's Zonyl-TM), 1.0 g hydroxyethyl methacrylate, and 1.0 g methacrylic acid were polymerized in 148.6 g of glacial acetic acid at 72° C. over a 6 hour period, using 0.3 g AIBN as initiator. The polymerization progressed remarkably well, and the polymeric product remained soluble in the mixture. The polymer precipitated out of the acetic acid at temperatures below about 50° C. The reaction mixture was poured into water, the polymer precipitated, and recovered. The yield was 80.6%.

The above procedure was repeated, using 1,1,2-trichloro trifluoroethane as polymerization medium and VAZO®52 as initiator, with comparably good results.

EXAMPLE 2

After work-up and drying, the product of the glacial acetic acid polymerization of Example 1 was dissolved in Fluorinert® FC-75 solvent under heating at about 75° C. to obtain a 5% wt./vol. solution of the terpolymer. Upon cooling, the terpolymer remained in solution; no precipitation nor haze was noted. Separately, a 5% wt./vol. solution of amorphous fluoropolymer (du Pont's Teflon® AF-1600 resin) in Fluorinert® FC-75 solvent was prepared at room temperature, and mixed in 1:1 vol./vol. ratio with the above-described solution of the terpolymer. This mixture remained absolutely clear. A portion of this mixture was deposited on a silicon wafer and dried and heated for 10 min. at 120° C. Thereafter, the refractive index of the coating was found to be 1.3452 at 632.8 nm.

Another portion of the 1:1 vol./vol. mixture of Example 2 was diluted with Fluorinert® FC-75 solvent to 0.62% wt./vol. total polymer concentration and sprayed on glass and on biaxial nylon-6. Following evaporation of the solvent, the coating was cured by heating to 160° C. for 4 hours. It had a very good visual appearance. The coating was of sturdy mechanical quality and adhered extremely well to the substrates, in dramatic contradistinction to coatings on these substrates prepared from the Teflon® AF-1600 resin alone, which practically fell off these substrates and were very crumbly in appearance.

A solution of amorphous fluoropolymer (du Pont's Teflon® AF-1600) and the terpolymer product of Example 1 in 2:1 weight ratio, in a 1:1 vol./vol. solvent mixture of Fluorinert® FC-75 solvent and 1,1,2-trifluoro trichloroethane was prepared, containing 3 weight % of the polymer blend in the mixed solvent. Glass slides, silicon wafers, polyethylene terephthalate (PET) and nylon-6 films were dip-coated with this polymer blend solution, dried in air, followed by curing at 140° C. for about 1 hour. Solid, adhering coatings were obtained. The refractive index of these coatings at 632.8 nm was 1.3275 (average of 2 measurements of 1.3273 and 1.3276). Here, again, comparative coatings prepared from the amorphous fluoropolymer alone fell off the substrates upon drying or just by blowing air on them.

As previously indicated, the polymeric compositions of this invention can also be cross-linked employing conventional cross-linking agents, such as, for example, diisocyanates, carbodiimides, diacid chlorides, and the like. Examples of specific effective crosslinking agents include hexamethylenediisocyanate, methylene di-p-phenyldiisocyanate, 1,3-dicyclohexyl carbodiimide, dodecanedioyl dichloride and adipoyl chloride. The crosslinking agents are employed in amounts conventionally employed to obtain desired cross-linking of the polymer which, by use of such agents, can take place at ambient temperatures.

To be effective in suppressing the undesired reflection, the anti-reflection coating should have a refractive index less than that of the substrate, or the underlying layer on which the coating is applied, and have the appropriate optical thickness. The optical thickness is defined as the physical coating thickness times the material's refractive index. According to the conventional theory of reflection for dielectric interfaces, the reflectivity for normally incident light is given by $$R_{\lambda/4} = \left[ \frac{n_1^2 - n_0 n_s}{n_1^2 + n_0 n_s} \right]$$

Therefore, in order to achieve zero reflectivity (numerator set to 0), the ideal coating refractive index is equal to the square root of the refractive index of the substrate times the square root of the refractive index of surrounding medium. In most applications, this surrounding medium is air, which has a refractive index of 1. Hence, if the refractive index of the coating material is exactly equal to the square root of the substrate refractive index, all surface reflection will be eliminated at the wavelength corresponding to 4 times the optical thickness. At other wavelengths, while the destructive interference from the reflected light from the top and bottom coating interfaces will not be complete, substantial reduction in reflection will still be obtained. For most applications, the optimal anti-reflection coating can be obtained by making the optical thickness one quarter of the mid-point of the visible wavelength range (one quarter of 5500 Angstroms or about 1400 Angstroms). It should be noted, however, that in certain circumstances, it may be desirable to reduce the reflection in a certain portion of the spectrum other than the midpoint. This can easily be done by slightly altering the process parameters.

In general, the substrates being coated with the above-described fluoropolymer blends have a refractive index of at least 1.49. Ideally, the refractive index of the coating material should fulfill the square root requirement mentioned above. For example, to optimally coat standard window glass, which has a refractive index of about 1.5, the coating material should have a refractive index of about 1.23. To coat many polyesters, which have a refractive index of about 1.66, the coating material should have a refractive index of about 1.29. While these polymer blends do not achieve this ideal, their refractive index is sufficiently low to make them useful for anti-reflection coating applications. As an example of this, uncoated substrates with a refractive index of 1.5 have a reflectance of about 4% per surface at normal incidence. Preferably, reflections below 2% are desired, which corresponds to a coating refractive index of less than 1.41; more preferably, reflections below 1.5% are desired, which corresponds to a coating refractive index of less than 1.38. Most preferred are reflections below 1%, which require a coating refractive index of less than 1.35.

Although single layer coatings are sufficient for many applications, they do have limitations. For example, the minimum reflectance, per surface, obtained by using a single polymer blend layer on crown glass is about 0.9%. In many circumstances, this may be unacceptably high. It is possible to even further reduce, and often completely eliminate, the minimum surface reflection by using multi-layer anti-reflection coatings, specifically two layer coatings. One of the trade-offs, however, is that the reflection rises rather sharply away from the wavelength of minimum reflectance. The creation of two layer coatings involves the application of a high refractive index layer onto the substrate surface, then the subsequent application of a low refractive index layer on top. The refractive index of the high index layer must be greater than that of the substrate, while the refractive index of the low index layer must be lower than the substrate. It should be noted that solvent selection is extremely important, so that they are compatible with the substrate and do not redissolve the other coating layers.

Those skilled in the art will realize that unlike with single layer coatings, the thicknesses of each layer in a two layer coating can be modified over a relatively wide range to produce the desired anti-reflection coating. The optical thickness of high index layer is preferably about one quarter to one half wavelength, while the optical thickness of the low index layer is preferably about one quarter wavelength. In the most conventional two layer coatings, each layer has an optical thickness of one quarter wavelength. Ideally, in this case, the coating materials are chosen such that the square of the refractive index of the high index material divided by the square of the refractive index of the low index material is equal to the refractive index of the substrate. If this is not possible, it is preferable that the index difference between each layer and the substrate be at least 0.1. Quantitative determination of the reflection properties of multilayer dielectric coatings are well understood and known to those skilled in the art.

Every application has its own glare reduction requirements. Since it is not possible to attain zero reflectance across the entire spectrum, each application must be analyzed to choose the optimal coating. The goal of minimizing the total reflectance can be achieved by numerically calculating the integral $$TR = \int_\lambda R(\lambda) I(\lambda) S(\lambda) d\lambda$$

where TR is the total reflectance, $R(\lambda)$ is the spectral reflectance, $I(\lambda)$ is the spectral intensity distribution, $S(\lambda)$ is the spectral sensitivity of the detector, and $\lambda$ is the wavelength. Ideally, the reflectance minimization is accomplished by reducing the reflectance in the wavelength region where $I(\lambda)S(\lambda)$ is large.

The refractive index of the anti-reflection coatings can be determined as follows: A 15-20 wt. % solids solution of the polymer blend in an appropriate solvent is spin cast onto a clean silicon wafer at rotation speeds between 1500 and 3000 rpm. In general, this will yield a film thickness between 1 and 3 microns. The fluoropolymer blend coating is then cured in a convection oven at 150° C.±20° C. for 4 hours. However, it was found that the refractive indexes were unaffected with cure times as short as 10 minutes and as long as 24 hours. The room temperature refractive indexes of the polymer blends are then measured at 632.8 nm using a Metricon ® PC-2000 Prism Coupler.

The substrates used for anti-reflection coated devices include, but are not limited to, two major categories: inorganic oxides and plastics. Typical inorganic oxides include, but are not limited to, fused quartz, glass (all grades of optical glass as well as any and all common varieties), and sapphire.

Typical substrates include optical lenses; eyeglasses, both plastic and glass; windows, glass as well as polymeric windows, such as windows of clear polymeric vinyl (incl. copolymers thereof), styrene, acrylics (such as Plexiglass) or polycarbonate (Lexan ® supplied by General Electric); clear polymer films such as vinyl (incl. copolymers), nylon, polyester, derivatized cellulose, and the like; the exterior viewing surface of optical (electro-optical) flat panel displays, such as liquid crystal displays of all types, ac plasma displays, dc gas discharge displays, electroluminescent displays, light emitting diodes, vacuum fluorescent displays, and the like; cathode ray tubes (e.g. video display tubes for televisions and computers) and the like; the surface of glossy displays and pictures, such as glossy prints and photographs, and the like; and optical indicator components, such as dials, knobs, buttons, windows and the like in environments where reflections are a problem such as aircraft interiors, aircraft cockpits, automotive interiors and the like.

The following describes typical procedures for applying the anti-reflection coatings to make the devices of the present invention. This description is illustrative only, and subject to modification from case to case to optimize coating quality and/or to accommodate different materials, as is within the skill of the art.

Prior to the coating operation, the substrates are scrubbed clean with methanol in an ultrasonic cleaner for at least 30 seconds. Upon removal, they are sprayed with fresh methanol to insure that no contamination remains on the surface. After being blown dry with filtered nitrogen air, the substrates are baked in an convection oven for about 5 minutes at about 100° C. to remove any residual moisture. No additional surface treatment steps are necessary before applying the coatings.

The substrates may be coated either by spin coating or dip coating from solutions of the polymer blends described above. Flexible substrates, such as nylon or polyester (Mylar) films are preferably dip coated. Rigid substrates may be coated using both methods. The polymer blend solution concentrations needed for these applications varied depending upon the specific polymer blend, the molecular weight of its individual components, and the solvent used. In general, workable polymer blend concentrations are in the range of 0.5 wt. % to 3 wt. % solids for spin coating and 3 wt. % to 8 wt. % solids for dip coating. It should be noted that for dip coating, polymer blend concentration variations of 0.1% were found to alter the thickness of the film on the order of 100 Angstroms.

The dipping can be performed using a Newport Corporation Actuator 850 motorized micrometer attached to a translation base, typically employing a stage range of 1 inch. The actuator may be controlled by a Newport Programmable Controller 855C. Substrates are dipped into and pulled out of polymer blend solution at rates between 100 and 400 microns/second, where faster pulling rates correspond to thicker films. As an approximate rule, the thickness of the pulled film increases linearly with the pulling rate. In our operation, the polymer blend solution was contained in a vial that was, at most, half full. This allowed for the upper half of the vial to have a semi-solvent atmosphere, giving the film time to dry slowly. Dip coating needed to be done in an area with no drafts, since the air currents tended to create streaks on the substrates by causing substrate motion and inhomogeneous drying. Unless special precautions are taken, dip coating yields polymer films on both sides of the substrate.

The spin coating may be performed using a Headway Research photoresist spinner. In our operation, the spinner was enclosed in a Plexiglass box with a laminar flow hood mounted on top. Filtered nitrogen air was used to purge the spinning chamber and keep it reasonably dust-free. Samples were spun cast at rotation speeds between 1500 and 3000 rpm.

All initial samples on non-polymeric substrates were cured in a convection oven at 150° C. for 4 hours. It was found, as with the refractive index measurements, that curing times ranging from 10 minutes to 24 hours did not affect the overall optical properties of the films. Subsequent samples were therefore cured at temperatures between 100° C. and 150° C. for up to 1 hour. For two-layer films, the initial layer was cured for at least half an hour before the second layer was coated. It will be recognized that other curing means can be employed, including infrared lamps, hot bars, microwave radiation, infrared lasers, as well as other sources of thermal stimulation.

The thicknesses of the anti-reflection films were measured using two different methods. For glass substrates, a Sloan Dektak IIA profilometer was used not only for the thickness measurements, but also for an evaluation of the surface roughness. A measure of the thickness could also be inferred from the transmission in the spectral data of the anti-reflection coated sample. Since there was a high degree of correlation between the theoretical model and the experimental data, it was possible to obtain a highly accurate thickness measurement by matching the experimental wavelength of minimum reflection with the theory. This latter method was used exclusively with the plastic substrates.

All transmission and reflection measurements of anti-reflection coated samples were done using a Perkin-Elmer Model 330 spectrophotometer. The normally incident transmission measurements were done relative to air. Many of the plastic substrates contained dyes, microcrystallites, or surface machine grooves that were not removed after manufacturing. It was therefore often difficult to infer absolute reflectivity from the transmission spectra. Reflectance spectra were taken relative to a freshly aluminized quartz slide and calibrated by measuring the reflectance from a clean quartz slide. Due to the geometry of the apparatus, the probe beam had a 6. angle of incidence on the sample.

Glass (of any type, incl. optical glasses as well ordinary window glass), quartz, and oxide crystals, such as sapphire, are rigid substrates that are impervious to all organic solvents. They are, therefore, the most easily processable. Anti-reflection coated samples are conveniently prepared via either spin coating or dip coating, followed by curing at elevated temperature. Since sapphire has a very high refractive index, the amount of reflected light can be significantly reduced by simply using a single layer anti-reflection coating with materials having a refractive index of approximately 1.34.

Unlike sapphire, both quartz and microscope glass have relatively low refractive indexes. While the reflection can be significantly reduced by applying a single polymer blend layer of the appropriate thickness, it may be advantageous to use a two layer coating. As stated earlier, the bottom layer consists of a high refractive index material and the top layer consists of a low refractive index material. The words "high refractive index" and "low refractive index" are referenced relative to the refractive index of the substrate.

In general, each layer in a two layer anti-reflection coating can have a rather wide range of thicknesses. In the most common embodiment, however, each layer has an optical thickness of one quarter wavelength. The high index layer can be made from a wide range of materials, such as poly (9-vinyl carbazole) which has a refractive index of approximately 1.67. This polymer readily dissolves in many common solvents, such as cyclohexanone.

As an example of the advantages of two layer coatings, consider a substrate with a refractive index of 1.5. The bare substrate would have a reflectance of 4% per surface at normal incidence. If a single layer coating, with a refractive index of 1.345, were applied at a quarter wavelength optical thickness, the reflectance would decrease to 0.9% per surface at 5500 Angstroms. If the substrate had a two layer coating, low index layer with a refractive index of 1.38 and high index layer with a refractive index of 1.67, both with an optical thickness of one quarter wavelength, the reflectance would decrease to 0.02% per surface at 5500 Angstroms.

The anti-reflection coating process described above can also be applied to polymeric materials. In particular, materials that do not dissolve or swell in the solvent systems used for the coating materials, such as cured epoxies, cured polyurethanes, nylon, polyester, Lexan ® (polycarbonate), Plexiglass (thermoplastic acrylics), and the like can be readily coated. Other polymeric materials, such as polytetrafluoroethylene, may be dissolved or swelled by the solvents or solvent systems described above. In these cases, an alternate coating mechanism will need to be employed, such as the use of a different solvent system, melt processing, or water based emulsion. In general, when the solubility parameter δ of the solvent or solvent mixture of the coating is different from (either larger or smaller) the measured or calculated solubility parameter of the substrate by more than about 1 (MPa)$^{\frac{1}{2}}$, then the solvent mixture will not dissolve the substrate. For example, the δ$_{solvent}$ (MPa)$^{\frac{1}{2}}$ for TCTFE = 14.8
Fluorinert FC-75 = 12.7
1:1 FC-75/TCTFE = 13.8
tetrahydrofuran (THF) = 18.6,
1:1 THF/hexafluoroxylene (HFX) = 17.2.

Accordingly, the following solubilities will be observed:

| Solvent | Substrate | δ$_{substrate}$ | Result |
|---|---|---|---|
| TCTFE | PET | 21.9 | no effect |
| FC-75 | nylon 66 | 27.8 | no effect |
| THF | PTFE | 12.7 | no effect |
| THF | Lexan | 20.5 ± 1 | soluble |
| THF | PVC | 19.3 | soluble |
| MEK* | Lexan | 20.5 ± 1 | soluble |
| THF | polystyrene | 17.6 | soluble |
| THF | poly(methyl methacrylate) | 18.6 | highly soluble |
| 1:1 TCTFE/FC-75 | Lexan | 20.5 ± 1 | insol. (no effect) |
| dto. | PVC | 19.3 | insol. (no effect) |
| TCTFE | Lexan | 20.5 ± 1 | insol. (no effect) |

*methyl ethyl ketone

Incidentally, the solubility parameter δ for a fluoropolymer blend, as above described, employing a terpolymer of the composition 98:1:1 perfluoroalkyl ethylmethacrylate/methyl methacrylate/hydroxyethyl methacrylate (Example 1, above) together with DuPont's Teflon®AF-1600 as the amorphous fluoropolymer, in terpolymer:fluoropolymer weight ratio of 1:1, is 13.2 (MPa)$^{\frac{1}{2}}$, so that that fluoropolymer blend is soluble in both FC-75 as well as 1:1 vol./vol. FC-75/TCTFE.

EXAMPLE 5

Figure 1:
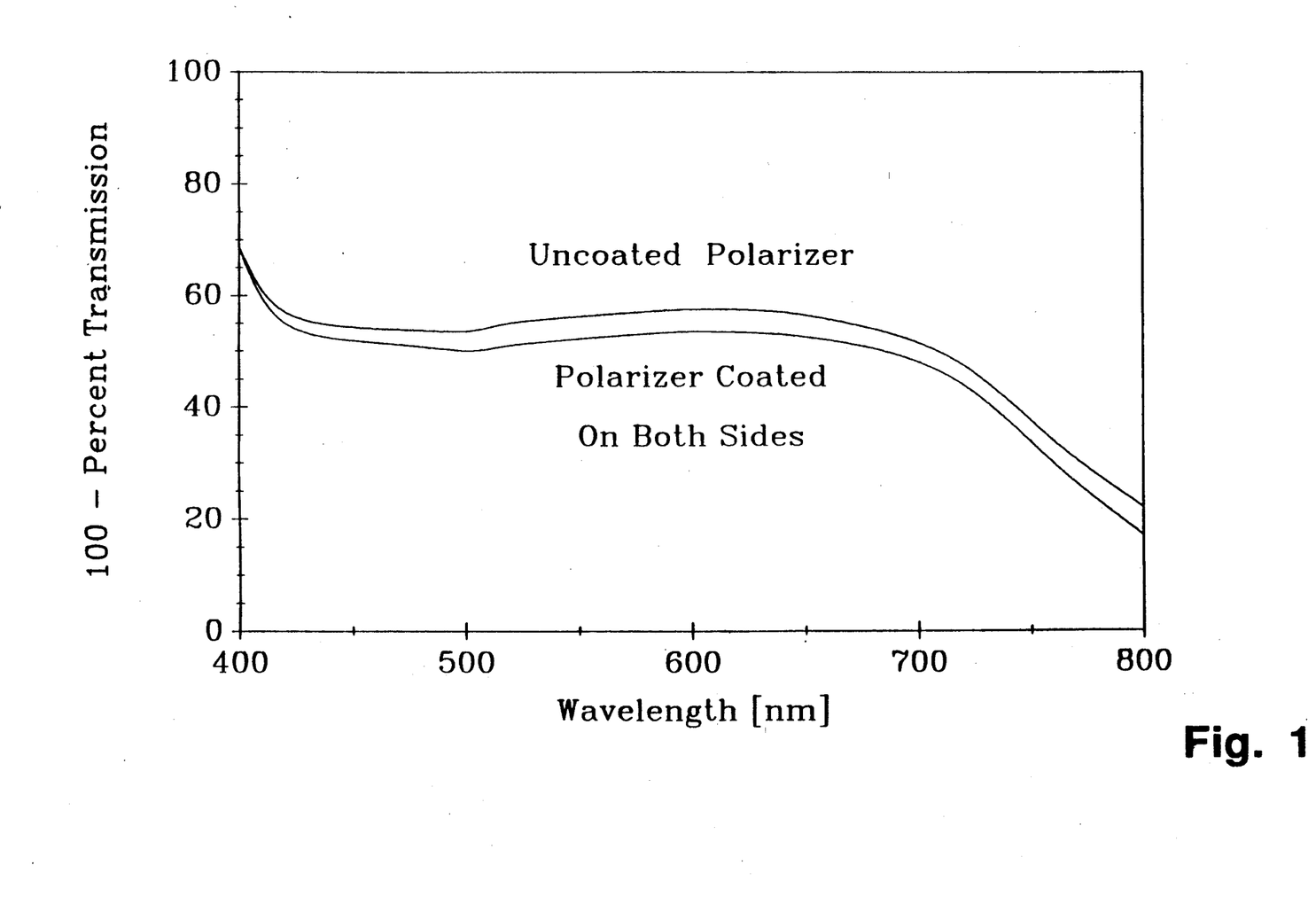
FIG. 1—Plexiglass sheet (Example 5)

A single layer anti-reflection coating of the composition 1:1 amorphous fluoropolymer (DuPont's Teflon ® AF-1600) and the terpolymer product of Example 1 was applied to a 5 mm thick, 50 mm diameter Plexiglass disk in the above-described manner via spin coating from a 2.2 wt. % polymer blend solution in Fluorinert ®FC-75 onto one side using spin rotation of 2000 rpm, followed by curing at 100° C. for 30 minutes. The coating process was then repeated on the other side. Transmission spectra for both the coated and the uncoated disk are shown in FIG. 1. Significant enhancement of optical transmission is achieved by the coating.

Most common eyeglass lenses are made out of glass (n = 1.51) or a hard crosslinked polymer resin (n = 1.51). In both cases, the materials do not dissolve in the solvents used for the above-described polymer compositions. Single layer anti-reflection coatings were applied to both types of lenses via dip coating, using ~4 wt. % solution of 1:1 amorphous fluoropolymer (DuPont's Teflon ®AF-1600) and terpolymer product of Example 1 in Fluorinert ®FC-75. Transmission spectra were taken for both uncoated and coated low positive diopter lenses. We observed about 97.5% transmission for a single layer coated lens, while an uncoated lens exhibited about 91.5% transmission. There were negligible differences between the glass and resin lenses.

EXAMPLE 7

There is a move toward higher refractive index materials for eyeglass lenses, to allow for thinner, therefore lighter, lenses with reduced curvature. Chemically hardened polycarbonate is a material of choice. A single layer anti-reflection coating using the polymer blend solution of Example 6 was applied to a non-prescription chemically hardened polycarbonate lens via dip-coating. The lens material had a refractive index of about 1.6. Transmission spectra were taken both before and after the coating operation. We observed about 98.5% transmission for the single layer coated lens, vs. about 89% transmission for the uncoated lens.

EXAMPLE 8

Figure 2:
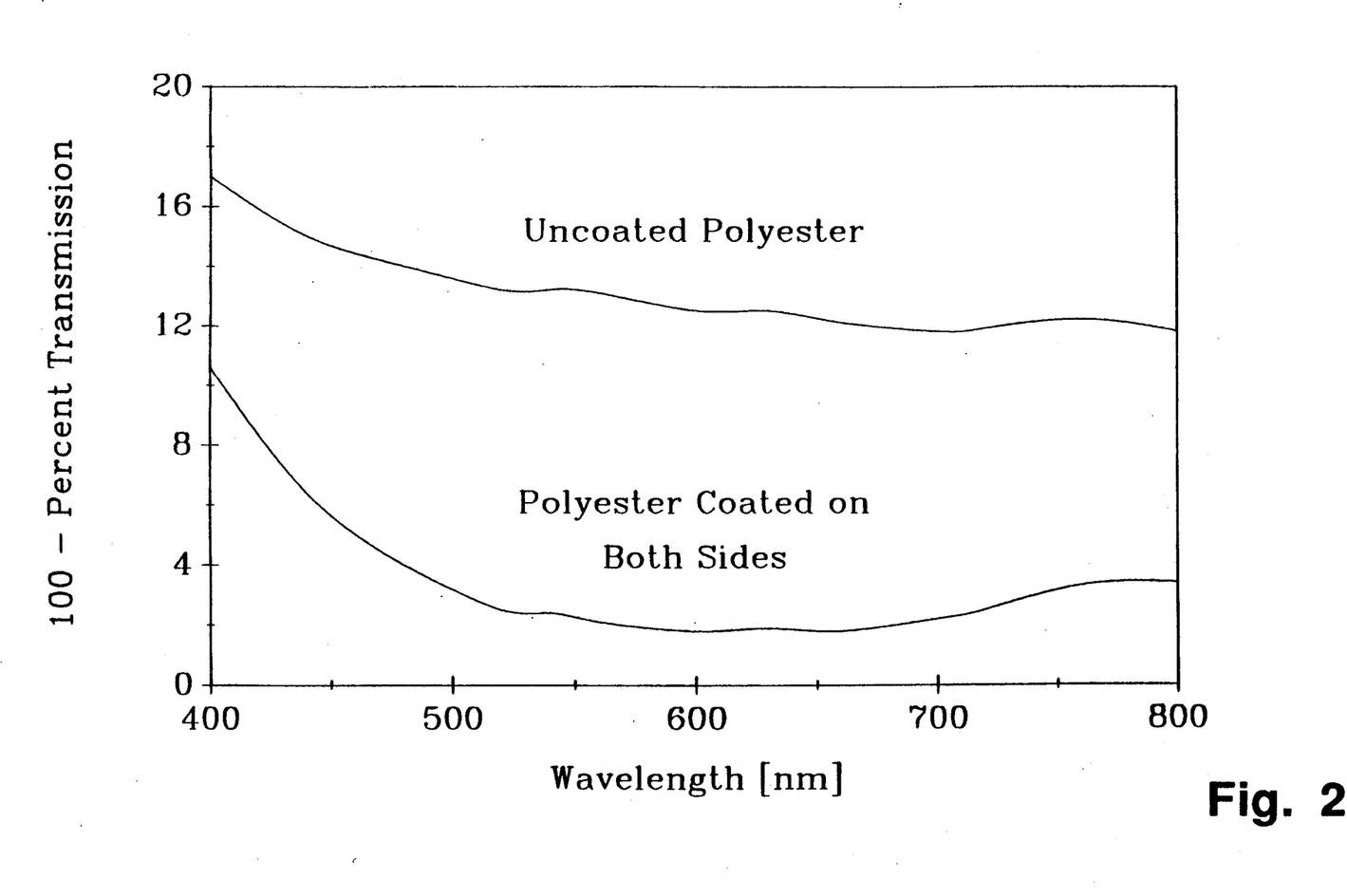
FIG. 2—plastic polarizer sheet (Example 8)

A single layer anti-reflection coating of a blend of the composition was applied using the polymer blend solution of Example 6 by the above-described dip coating procedure to each of the three components of the liquid crystal display window of an electronic calculator (Canon HS-101H) viz. (1) the liquid crystal display; (2) the plastic sheet polarizer; and (3) the polycarbonate faceplate covering the display and polarizer. Each of the three components exhibited a significant increase in transmission. The coated faceplate showed 98% transmission at a wavelength of 600 nm vs. 89% transmission for the uncoated faceplate at the same wavelength. The sheet polarizer was designed to selectively absorb one polarization, while being almost transparent to the orthogonal polarization. Therefore, for unpolarized light, we should have observed only 50% transmission less the appropriate transmission loss. The top curve in FIG. 2 demonstrates this phenomenon. It also shows a 4% increase in transmission (reduction in reflectance) after application of a single layer of the anti-reflection coating. The reflectance of the outer glass surface of the liquid crystal display also decreased from about 4.25% for the uncoated component to about 1% for the coated display. When reassembled, the calculator viewing window exhibited about 13% less reflectance. This was visually demonstrated by a dramatic increase in the contrast of the display.

EXAMPLE 9

Figure 3:
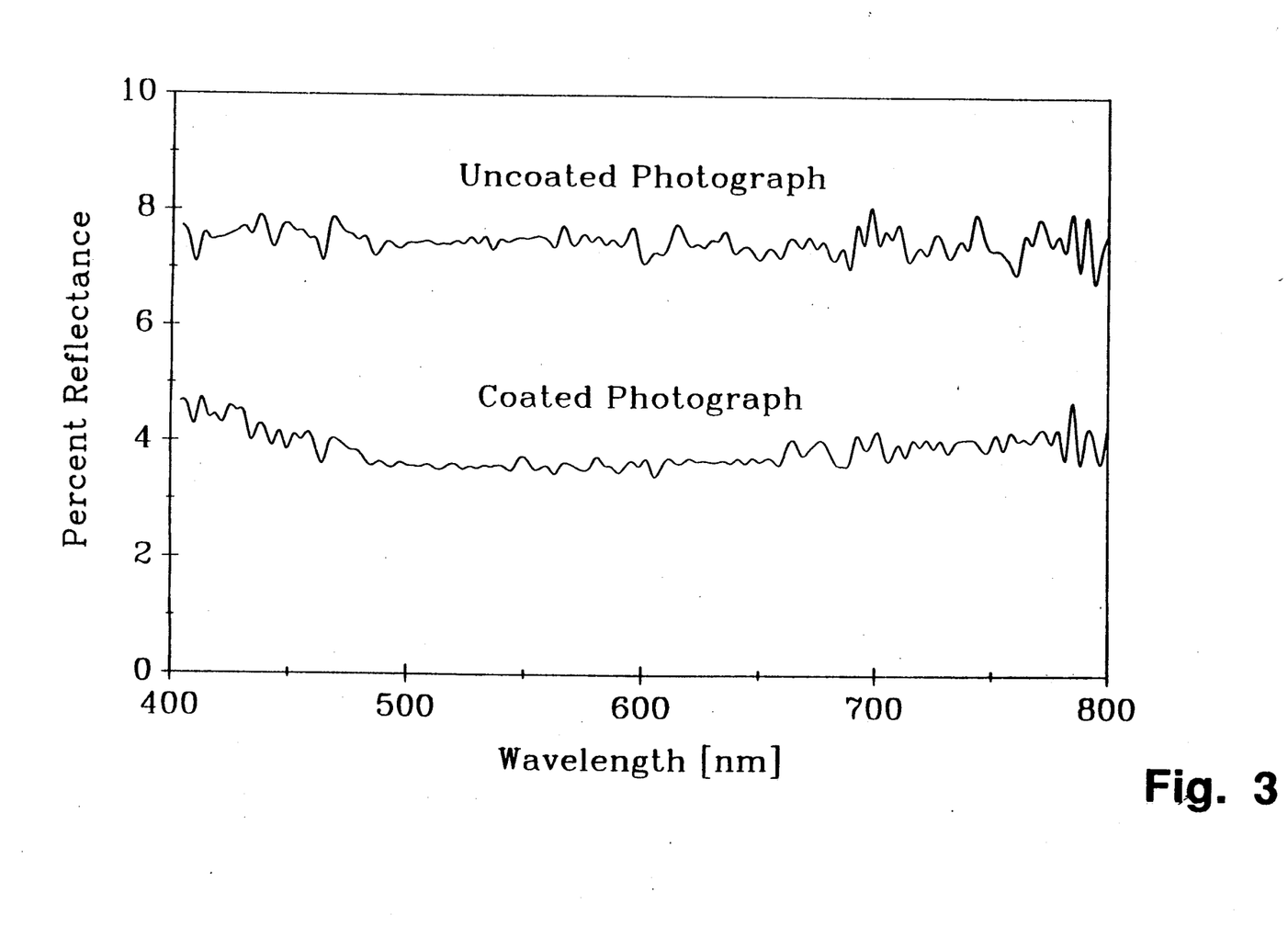
FIG. 3—glossy photograph (Example 9)

When a glossy photograph is viewed under normal lighting conditions, a small, though significant, portion of the light is reflected back, making the color and the image appear "washed out". To minimize this problem, it is usual practice to use a mat surface finish. This, however, reduces the resolution of the image. We have demonstrated that an anti-reflection coating of a thin layer of the above-described polymer blend when applied to a glossy photograph significantly reduces specular reflection. A glossy black and white photograph containing a uniformly black image was partially coated with above-described fluoropolymer blend using the polymer blend solution of Example 6 via dip coating. The total reflectance, both specular and diffuse, was measured using a Perkin Elmer 330 spectrophotometer equipped with an integrating sphere. Measurements were performed on both the uncoated and coated sections of the photograph at a 7° angle of incidence. The data, shown in FIG. 3, demonstrates the substantial decrease in reflectance.

A further effective application of the anti-reflection coated optical devices of the present invention involves their use as transparent covers for read-out instruments and instrument panels, such as automotive instrument panels. Such panels are commonly tilted, or curved, to reduce back reflected light. Tilting or curvature tend to reduce overall visibility, and to increase the size of the component. Application of an anti-reflection coating of the above-described fluoropolymer blend composition effectively reduces reflection and increases instrument visibility.

Besides spin coating and dip coating, as above described, the anti-reflection coating may also be applied by spray coating and roller coating. In the former, a fine mist of polymer solution is sprayed onto the substrate in a semi-solvent atmosphere and allowed to dry slowly. There are numerous parameters that need to be controlled in order to use this technique: solution viscosity, mist particle size, substrate movement speed, spray area overlap, and sample orientation. In the latter, roller coating, a squeegee (similar to that used in screen printing) is used to apply a uniform thin polymer layer.

Figure 6:
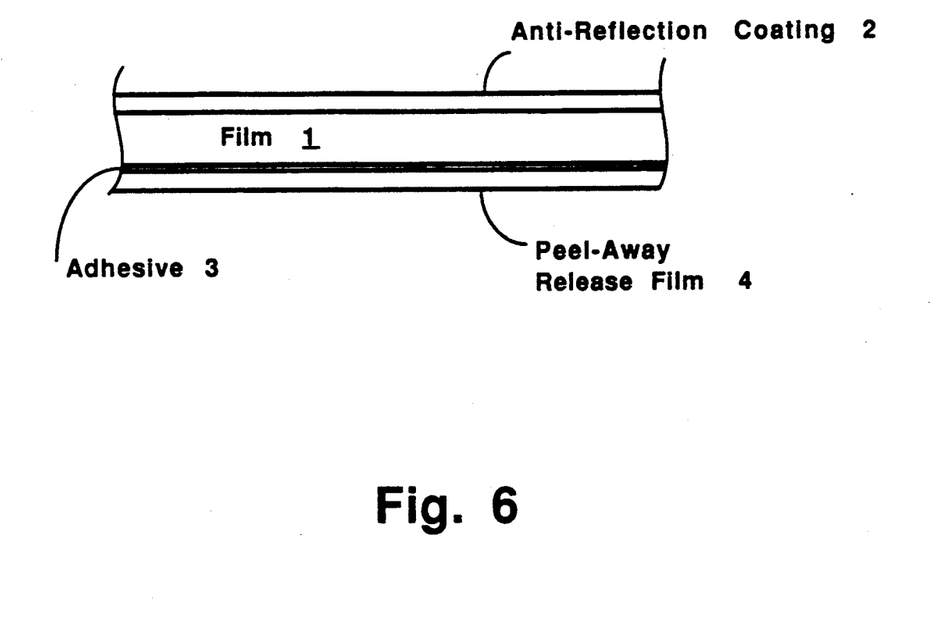
FIG. 6—illustrates construction of a transferable anti-reflection coating comprising an adhesive-backed optically clear polymer film having an anti-reflection coating.

There are some difficulties in applying a thin polymer layer of uniform, predetermined thickness to large curved objects. A transferable anti-reflection coating could provide a solution. In accordance with the present invention, this is accomplished by the provision of a structure (herein referred to as "appliqué") comprising an optically clear plastic film, such as polyester (Mylar) which is anti-reflection coated on one side, with an refractive index matching adhesive on the other side, as is illustrated in FIG. 6. As shown in FIG. 6, an optically clear plastic film 1 has an anti-reflection coating 2 applied to one side, and an adhesive coating 3 on the opposite side. The adhesive coating 3 is backed with peelaway release film 4, which may be conventional releasecoated paper. For application, the release film is peeled off, and the anti-reflection coated highly transmissive optical film is applied to the viewing surface of flat surface displays ( as enumerated, supra.), CRT's, VDT's, eyeglasses, etc. This alleviates the problem of trying to coat cumbersome objects. If damaged, the appliqué can easily be removed and replaced. Preparation of such an appliqué is illustrated by Example 10, below:

EXAMPLE 10

Cleer-Adheer® sheet (C-Line Products, Des Plaines, Ill.) was used as the base for an appliqué. The sheet consists of a mylar film backed with a pressure-sensitive acrylate adhesive and peel away release paper. A portion of the laminating sheet was dip coated with the polymer blend solution of Example 6 and baked at 100° C. for 60 minutes. Visually, there was a significant difference in light transmission and optical clarity between the uncoated and coated sections.

EXAMPLE 11

A 0.05 mm thick clear security Llumar Film (All Purpose Glass Coating Co., Clifton, N.J.), consisting of a polyester film backed with a pressure sensitive adhesive and a peelaway plastic backing film, was used as the base for an appliqué. A 20×25 cm sheet of this film was laid flat on one side of a wet glass sheet. The water permitted easy movement of the film until it was placed in the proper position. Using a soft cloth, the water was pressed out, leaving an adhesive/glass interface. The same process was repeated on the other side of the glass. The glass sheet so treated on both sides was allowed to dry at room temperature for 24 hours, after which time it was baked at 60° C. for 4 hours. The resultant coated glass sheet was clear and free from air bubbles. The surfaces were cleaned with soap and water, followed by drying at 100° C. for 10 minutes. The entire glass sheet was then dip coated with a solution of the polymer blend solution of Example 6 and baked at 100° C. for 30 minutes. There was a significant enhancement of optical transmission, as measured using a Perkin Elmer 330 spectrophotometer. The average total reflectance near 550 nm for the coated, laminated glass was approximately 4%, as compared to about 8.5% for the bare glass. The clarity enhancement was not quite as great as that obtained on a bare glass sheet coated with the polymer blend, possibly due to slight index mismatches between layers.

EXAMPLE 12

A film as described in Example 10, above, is dip coated with the fluoropolymer blend solution employed in Example 6. It is permitted to dry and is then baked at 125° C. for 1 hour to cross-link the polymer blend. Thereafter, the film is permitted to cool to room temperature, the backing film is peeled away, and the film without the backing sheet is placed on a wet glass sheet and properly positioned. The water is then squeezed out using a soft cloth, and the structure is permitted to dry at room temperature for 24 hours, followed by baking at 60° C. for 4 hours. The laminated glass sheet thus obtained exhibits significant optical clarity and increased light transmission.

EXAMPLE 13

Figure 4:
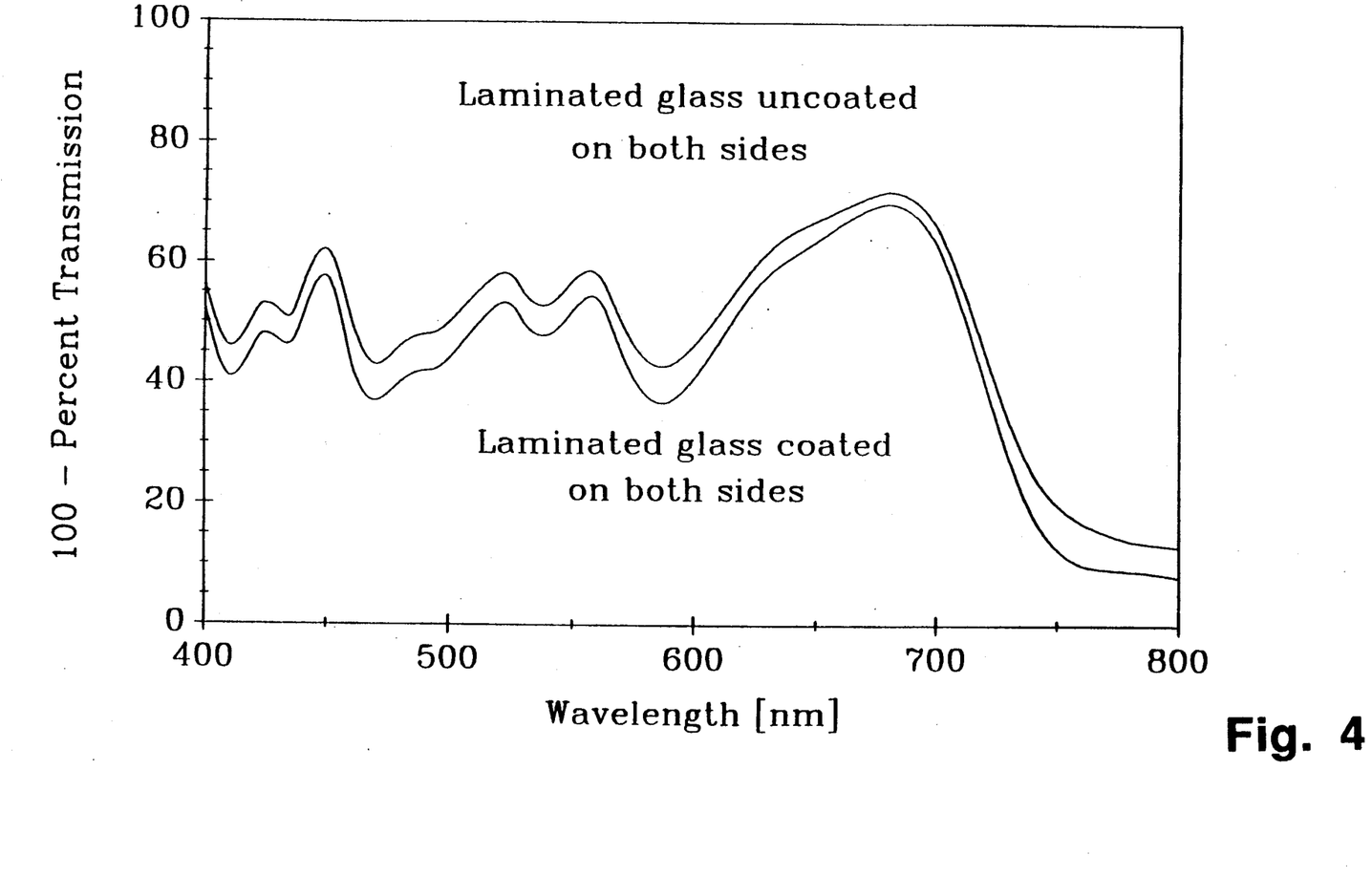
FIG. 4—laminated glass (Example 13)

The procedure of Example 11 was repeated, using an 0.1 mm thick neutral grey Llumar film (All Purpose Glass Coating Co., Clifton, N.J.). The transmission spectra for both the uncoated and the coated laminated glass are shown in FIG. 4. The increase in transmission corresponds to a reduction in the "mirror surface" of the window film. This is especially important for computer glare reduction screens.

EXAMPLE 14

Figure 5:
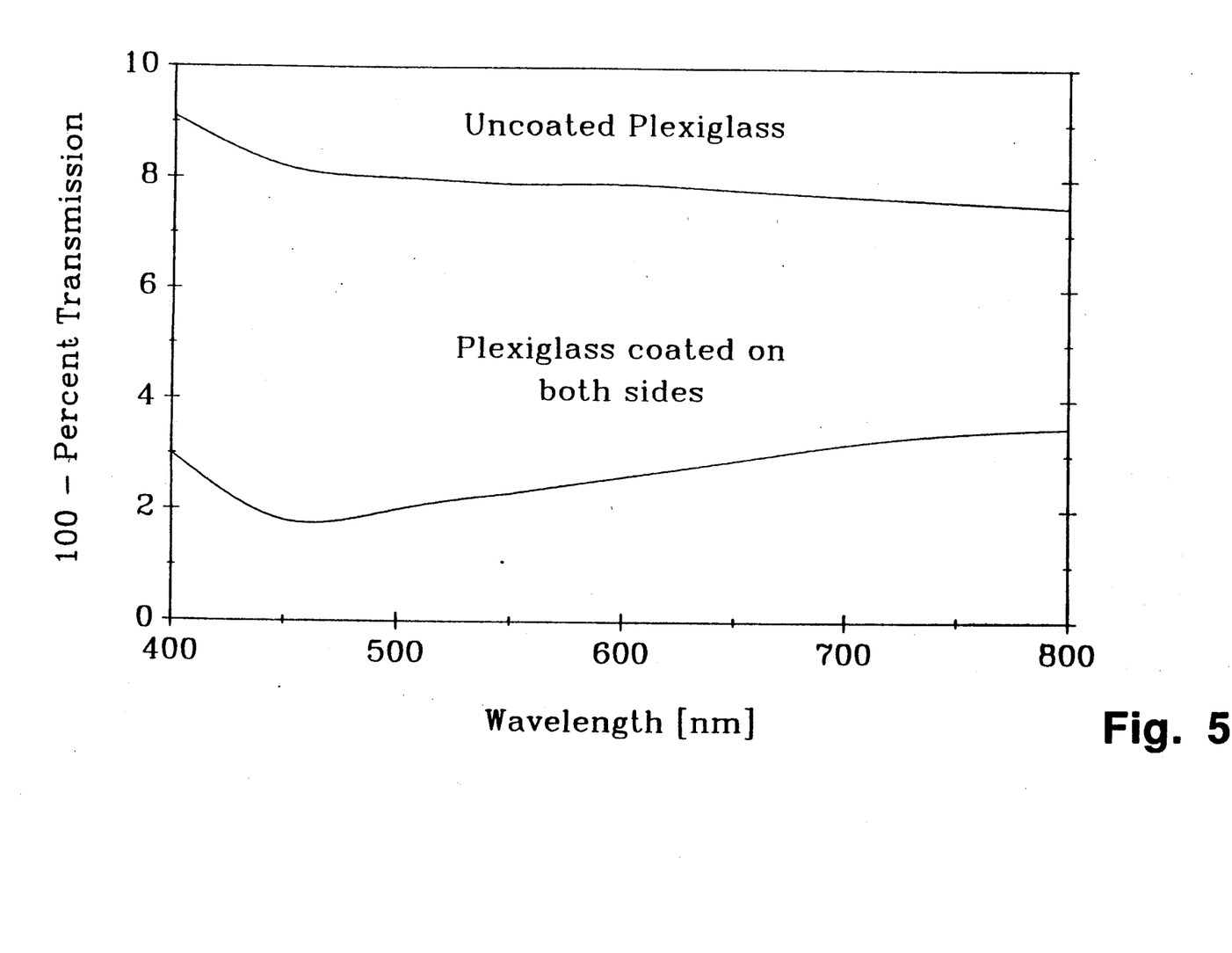
FIG. 5—polyester film (Example 14)

A 3×5 cm piece of untreated polyester film (Hostaphan HC-4000, from 3M Corp.) was cleaned with methanol in an ultrasonic cleaner, the dip coated in a solution of the polymer blend of Example 6 followed by drying and baking, as above described. Transmission spectra for the coated and uncoated film are shown in FIG. 5. Significant enhancement in optical clarity is obtained as a result of the coating.

Since various changes may be made in the invention without departing from its spirit and essential characteristics, it is intended that all matter contained in the description shall be interpreted as illustrative only and not in a limiting sense, the scope of the invention being defined by the appended claims.

We claim:

1. A solid body having a reflective surface, having deposited thereon as an anti-reflection coating a layer of a polymeric composition comprising a blend of
   (a) from about 1 to about 95 percent by weight of amorphous fluoropolymer, with
   (b) from about 5 to about 99 percent by weight of a fluorinated copolymer having a polymer chain composed of

$\{X_s\text{---}Y_t\text{---}Z_u\}$ units, wherein s, t and u represent weight proportions of the respective X, Y and Z units, and have values within the ranges of
s=from about 0.5 to about 0.995;
t=from about 0.0025 to about 0.4975; and
u=from about 0.0025 to about 0.4975;
with the sum of s+t+u being 1;
X represents units of the composition wherein
$R^1$ is H, —CH$_3$, or mixtures thereof;
p is 1 or 2;
n is an integer of from about 1 to about 40;
Y represents units of the composition wherein
$R^2$ is H, —CH$_3$ or —CH$_2$COOH;
Z represents units of the composition wherein
$R^3$ is H, —CH$_3$, or CH$_2$COOC$_m$H$_{2m+1}$, wherein m is an integer of from about 1 to about 4, and
$R^4$ is an alkylene bridging group, straight chain, branched or cyclic, having from 1 to about 8 carbon atoms;
wherein the X, Y and Z units may be arranged in any sequence, said amorphous fluoropolymer retainting its amorphicity in said blend and not phase separating during or after any curing.

2. A solid body according to claim 1 wherein the amorphous fluoropolymer in said blend is a copolymer of tetrafluoroethylene and a comonomer selected from the group consisting of CH$_2$=CHF; CH$_2$=CF$_2$; CF$_2$=CHF; CH$_2$=CH—C$_n$F$_{2n=1}$; CF$_2$=CClF; CF$_2$=CF—CF$_3$; CF$_2$=CF—O—C$_n$F$_{2n=1}$; CF$_2$=CF—O—CF$_2$CF(CF$_3$)—O—CF$_2$CF$_2$SO$_2$F; CF$_2$=CF—O—CF$_2$CF(CF$_3$)—O—CF$_2$CF$_2$COOCH$_3$ and and mixtures thereof.

3. A solid body according to claim 1 wherein the amorphous fluoropolymer in said blend is a copolymer of tetrafluoroethylene and 4. An anti-reflection coated solid body according to claim 1 wherein in said fluorinated copolymer $R^1$ is H.

5. An anti-reflection coated solid body according to claim 1 wherein in said fluorinated copolymer $R^1$ is —CH$_3$.

6. An anti-reflection coated solid body according to claim 1 wherein in said fluorinated copolymer X represents a mixture of units bearing H and —CH$_3$ as $R^1$ substituents.

7. An anti-reflection coated solid body according to any one of claims 1, 2 or 3 wherein Y and Z are present in about equimolar proportions.

8. An anti-reflection coated solid body according to any one of claims 1 through 6 wherein said fluorinated copolymer is cross-linked.

9. An anti-reflection coated solid body according to claim 8, wherein cross-linking of said fluorinated copolymer was effected by heat treatment at temperature between about 120° C. and about 180° C. for time sufficient to effect cross-linking.

10. An anti-reflection coated solid body according to claim 8, wherein cross-linking was effected by means of a cross-linking agent.

11. An anti-reflection coated solid body according to any one of claim 8 which is transparent.

12. An anti-reflection coated solid body according to claim 11 wherein the body is selected from the group consisting of optical lenses, eyeglasses, windows and polymer film.

13. An anti-reflection coated solid body wherein the anti-reflection coating comprises at least 2 layers, a first layer in direct contact with the body, said first layer comprising a polymer having a refractive index higher than the refractive index of the body, and a second layer deposited onto said first layer, wherein said second layer is a fluoropolymer according to claim 1 and has a lower refractive index than said solid body.

14. An anti-reflection coated solid body according to claim 13 wherein the fluoropolymer in said second layer is cross-linked.

15. An anti-reflection coated solid body according to claim 14 wherein cross-linking of said fluoropolymer was effected by heat treatment at temperature between about 120° C. and about 180° C. for time sufficient to effect cross-linking.

16. An anti-reflection coated solid body according to any one of claims 13, 14 or 15 which is transparent.

17. An anti-reflection coated solid body according to claim 16 wherein the body is selected from the group consisting of optical lenses, eyeglasses, windows and polymer film.

18. An anti-reflection coated solid body according to any one of claims 8, 13 or 14 which is adapted for viewing indicia located on or directly below said reflective surface.

19. An anti-reflection coated solid body according to claim 18 which is selected from the group consisting of flat panel displays, cathode ray tubes, glossy display surfaces or glossy photographic prints.

20. A transferable anti-reflection coated film according to any one of claims 8, 13, 14 or 15 comprising a transparent polymer film, which has the anti-reflection coating deposited on one side, and which is provided with a pressure sensitive adhesive coating on the opposite side.

21. A transferable anti-reflection coated film according to claim 20, further comprising a releasable protective layer in contact with said pressure sensitive adhesive coating.

22. A solid body having applied thereto a transferable anti-reflection coated film according to claim 20.

23. A solid body according to claim 22 which is transparent.

24. A solid body according to claim 22 which is a cathode ray tube or a liquid crystal display.

* * * * *